Nov. 26, 1968    S. C. BARTON    3,413,499
GENERATOR AIR GAP ENTRANCE BAFFLE FOR COOLING
STATOR CORE END PORTIONS
Filed June 20, 1966
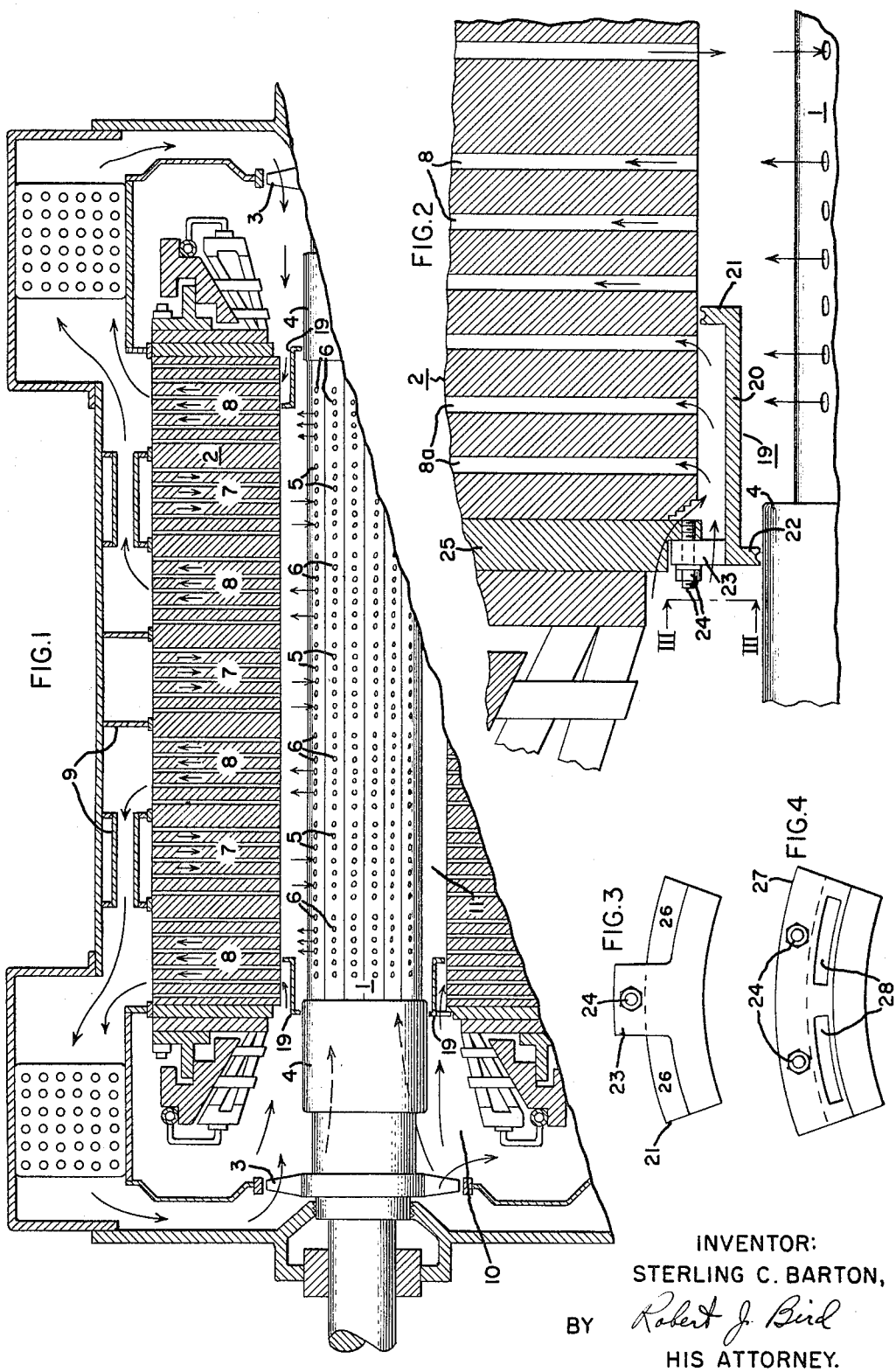
INVENTOR:
STERLING C. BARTON,
BY Robert J. Bird
HIS ATTORNEY.

United States Patent Office 3,413,499
Patented Nov. 26, 1968

3,413,499
GENERATOR AIR GAP ENTRANCE BAFFLE FOR COOLING STATOR CORE END PORTIONS
Sterling C. Barton, Scotia, N.Y., assignor to General Electric Company, a corporation of New York
Filed June 20, 1966, Ser. No. 558,940
4 Claims. (Cl. 310—58)

This invention relates to an improved arrangement for cooling in the stator core of a dynamoelectric machine and more particularly to an improved arrangement for cooling the end portion of a stator core in a dynamoelectric machine which is cooled by radial gas flow.

Dynamoelectric machines, such as large turbine-generators, typically are cooled by a gas such as hydrogen flowing radially from the rotor interior, through the air gap between the rotor and the stator, and through the stator laminations. The stator windings themselves may or may not additionally be cooled by a gas or liquid flowing within the insulation of the winding. The radial gas flow from the rotor, air gap, and through the stator laminations, serves to carry off the heat produced in the laminations due to eddy current and hysteresis losses. The heat generated in the stator laminations at the endmost parts of the machine presents a special problem of removal. There is more heat generated in the endmost stator laminations due to the added longitudinal end leakage flux at that part of the machine.

One environment for the present invention is in a generator of radial flow gap-pickup and discharge type. Radial flow gap-pickup and discharge rotors, and associated radial flow stators provide effective generator cooling. However, in the stator endmost portions, due to the added burden of heat removal, it is sometimes desirable to have the stator passages cooled by cooled gas discharging axially from the generator fan and not partially warmed gas discharging radially from the rotor. At the rotor ends where the air gap communicates with the generator end spaces, there is a tendency for gas flows to bypass the first few sections of stator ventilation ducts and thus not be as effective for purposes of cooling. This is due to the high axial component of gas flow at the gap entrance which produces a "venturi effect" or region of low static pressure at the entrances to the radial ventilation passages (ducts) in the end sections of the core at the inner diameter of the core. This is because the generator fan, outside the air gap, is discharging axially and without restriction into the air gap.

It is thus desirable to provide a means to raise the static pressure of the axial fan discharge within the air gap so as to more effectively motivate it through the stator outlet passages. It is also desirable to segregate the axial flow from the generator fan from the radial flow within the air gap by restricting communication between the generator end spaces and the air gap.

Other methods of restricting the communication between the generator air gap and the generator end spaces have heretofore been proposed. One example is shown in U.S. Patent 2,895,065, Rosenberg, in which the stator wedge members in the extreme end portions of the stator have depending flanges integral therewith. These flanges protrude into the air gap substantially restricting the communication between the air gap and the generator end spaces. This baffle is a relatively straightforward expedient for the purpose of eliminating gas flow from the generator end spaces into the generator air gap. However, the purposes and function of the present invention are directed to a different result as will be hereinafter made clear.

Accordingly, it is an object of the present invention to provide an improved arrangement for cooling the stator core of a dynamoelectric machine, particularly in the end laminations thereof.

Another object of the invention is to improve the effectiveness of the generator gas cooling system by more effective use of the high axial flow velocity of the gap entrance.

Another object of the present invention is to provide a baffle between the generator air gap and the generator casing which is simple to assemble and install and does not interfere with generator assembly.

Other objects, advantages and features of the present invention will become clear from the following description when taken in connection with the accompanying drawing, in which:

FIG. 1 is an elevation drawing, partly in section, of part of a dynamoelectric machine of the gas-cooled type according to the present invention.

FIG. 2 is an elevation drawing, partly in section of an end portion of the generator of FIG. 1, and drawn to an enlarged scale.

FIG. 3 is a detail view taken along the lines III—III of FIG. 2.

FIG. 4 is a detail, similar to FIG. 3, of a modified form of the present invention.

Briefly, stated, the present invention is practiced in one form by a radial-flow gas-cooled generator having a baffle separating the generator air-gap from the generator end space. The baffle permits axial gas flow from the generator fan to enter a certain distance into the air gap where it is "dead ended" and forced through the stator outlet passages in the endmost parts of the stator. The "dead end" feature also restricts communication between the end spaces and the air gap interior. That is, the baffle provides communication between the end space and the endmost stator laminations. Thus, the endmost stator laminations are cooled by the axial flow from the fan rather than by the radial flow from the rotor interior.

Referring now to FIG. 1 of the drawing, a generator rotor 1 is shown rotatably disposed within generator stator 2. Rotor 1 has an axial flow fan 3 mounted thereon. Retaining ring 4 is also mounted over the ends of rotor 1 in order to hold in the rotor windings in their end turn portions. Axially spaced along rotor 1 in discrete groups are gap pickup holes 5 and gap discharge holes 6. These groups or zones are in substantial correspondence with similar groups or zones in the stator 2. That is, stator inlet passages 7 are in substantial axial alignment with rotor gap pickup holes 5, and stator outlet passages 8 are in substantial axial alignment with rotor gap discharge holes 6. Radially outward of the stator laminations, the coolant gas entering inlet passages 7 is segregated from the coolant gas discharging from outlet passages 8 by means of partitions 9 which define flow circuits for the coolant gas to and from the rotor fan 3. As shown in FIG. 1, rotor fan 3 discharges axially inwardly, into the end space 10 and toward the generator air gap 11. Some of the flow from fan 3 enters the rotor interior from beneath retaining ring 4 where it is effective to cool rotor end windings. This flow under the retaining rings subsequently discharges radially from gap discharge hole 6 in the zones at each end of the rotor 1 into corresponding stator outlet passages 8. The axial flow from fan 3 also flows towards the generator air-gap 11 in end space 10, outside of retaining rings 4, and it is at this point that the present invention finds its usefulness. Assuming that there were no restriction between the end space 10 and the air-gap 11 such that flow from fan 3 could enter the air-gap 11 freely, it will be appreciated that in the area adjacent the end laminations there would be interference between the radial flow from passages 6 to passages 8, and the axial flow from fan 3. This interference would cause a general loss of effectiveness in the cooling of passages 8a at the ends. There would also be, due to the low static pressure of the high-velocity, axially-flowing gas at the air gap entrance, a low gas flow radially outward through the endmost cooling passages 8a.

The foregoing description having been directed toward the environment, the point of novelty of the present invention will now be described. Referring to FIG. 2, generator gap entrance baffle is generally shown at 19. Baffle 19 comprises a series of arcuate segments 20 which together make up a cylindrical member coaxial with the generator rotor 1. From each end of each segment project flanges 21 and 22. Flange 21, at the inner end of arcuate segment 20, projects into close relationship with stator core 2. Flange 22, depending from the outer end of arcuate segment 20, projects into close, though not abutting, relationship with rotor 1. It will of course be understood that there is relative movement between flange 22 and rotor 1.

Projecting radially outward from the outward end of arcuate segment 20 is a flange 23. Baffle 19 is mounted on the generator stator by means of a bolt or other fastener 24 connecting the flange 23 of the baffle piece to the stator end block 25. Arcuate segments 20 are arranged consecutively around the 360° periphery of the air-gap entrance. Flanges 23 extending from arcuate segments 20 are not as wide as segments 20. That is to say, flanges 23 around the air gap entrance, are spaced, defining flow passages 26 therebetween.

In another modification of the present invention, individual baffle pieces which constitute baffle 19, have a continuous flange 27, corresponding to flange 23 in the ward therefrom and defining flow passages 28 thereabove-described modification, extending radially outthrough.

In both the FIG. 3 and the FIG. 4 modification, the air gap entrance baffle 19 extends axially into the air-gap 11 to permit communication between the generator end spaces 10 and the stator outlet ducts 8a in the extreme ends of the generator stator core 2. That is to say, that axially outward of flange 21, the endmost stator outlet ducts 8a communicate with the generator end space 10; and axially inward of flange 21, the stator outlet ducts 8 communicate with the generator air-gap 11.

In operation, it will be seen that the air-gap entrance baffle 19 effectively segregates the generator air-gap 11 from the generator end spaces 10 so that radial flow inside the air-gap from rotor 1 to core 2 is not impeded or affected by the inward axial flow from fan 3. The discharge from fan 3 is permitted through flow passages 26 (or 28) and then abuts flange 21, forcing it to flow radially outward through the stator outlet passages 8a at the endmost regions of the stator core 2.

It will thus be apparent that an improved arrangement has herein been described for cooling the end portions of a dynamoelectric machine stator, which arrangement increases coolant effectiveness by eliminating flow interference and by channeling of fan discharge. In addition, since the gap entrance baffle of the present invention is easily installed after the generator rotor is positioned, it does not impede the positioning of the rotor within the stator.

It will occur to others of ordinary skill in the art to make modifications of the present invention which will remain within the concept and scope thereof and will not constitute patentable departure therefrom. For example, the baffle could be of such size as to segregate all of the end outlet passages 8 from the air-gap. Accordingly, it is intended that the invention be not limited by the details in which it has been described but that is encompass all within the purview of the following claims.

What is claimed is:

1. A dynamoelectric machine including a stator and a rotor, said stator defining end spaces and including a laminar core defining axially spaced radial passages therethrough, said rotor being of the radial-flow type, said rotor being disposed within said core and defining an air gap therewith, baffle means near the axial ends of said core restricting communication between said end spaces and said air gap, the radial passages in the end portions of said core being in communication with said end spaces.

2. A dynamoelectric machine according to claim 1 wherein:
    said baffle means comprises a substantially cylindrical member disposed around said rotor, a first radial flange projecting from one end of said cylindrical member into close proximity to said rotor surface, a second radial flange at the other end of said cylindrical member and projecting in abutting relation with said core axially inward of said radial passages in the end portion thereof, and means to mount said baffle means on said stator.

3. In a dynamoelectric machine comprising a rotor and a stator of the radial coolant flow type in which coolant gas moves radially inward through inlet passages in the stator, through the air-gap separating the stator from the rotor, and into the rotor, from which it emerges and flows radially outward through the air-gap and through outlet passages in the stator; the improvement comprising means to restrict axial gas flow into said air gap, said means permitting unobstructed access of axial gas flow to a selected number of said outlet passages located in the end portions of said stator.

4. In a dynamoelectric machine having a stator with radial cooling ducts and a rotor defining an air gap with the stator, the improvement comprising:
    baffle means attached to the stator outside the air gap and comprising a cylindrical member extending axially into the air gap, a first flange portion extending radially outward therefrom inside the air gap to isolate the endmost groups of said stator ducts from the air gap, and a second flange portion extending radially inwardly therefrom to form close clearances with the rotor at the end of the air gap.

References Cited

UNITED STATES PATENTS 2,653,255   9/1953   Baudry et al. _____ 310—64
3,348,081   10/1967  Willyoung _____ 310—55

OTHER REFERENCES

German printed application 1,003,343, Feb. 28, 1957 Hass et al. (310–61, 2 Shts. Dwg., 2 pp. Spec.).

J. D. MILLER, *Primary Examiner.*